(12) United States Patent
Xu et al.

(10) Patent No.: US 10,379,686 B2
(45) Date of Patent: Aug. 13, 2019

(54) TOUCH DISPLAY PANEL AND METHOD FOR DRIVING THE SAME

(71) Applicant: BOE Technology Group Co., Ltd., Beijing (CN)

(72) Inventors: Zhiqiang Xu, Beijing (CN); Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/544,986

(22) PCT Filed: Jan. 5, 2017

(86) PCT No.: PCT/CN2017/070272
§ 371 (c)(1),
(2) Date: Jul. 20, 2017

(87) PCT Pub. No.: WO2017/181740
PCT Pub. Date: Oct. 26, 2017

(65) Prior Publication Data
US 2018/0157352 A1 Jun. 7, 2018

(30) Foreign Application Priority Data

Apr. 20, 2016 (CN) .......................... 2016 1 0248686

(51) Int. Cl.
*G06F 3/041* (2006.01)
*G06F 3/044* (2006.01)
(52) U.S. Cl.
CPC ............ *G06F 3/044* (2013.01); *G06F 3/0414* (2013.01); *G06F 3/0416* (2013.01); *G06F 2203/04103* (2013.01)

(58) Field of Classification Search
CPC ..................... G06F 2203/04103; G06F 3/0484
(Continued)

(56) References Cited

U.S. PATENT DOCUMENTS 8,884,920 B1 * 11/2014 Switzer .................. G06F 3/044
345/174
2007/0242053 A1 10/2007 Muranaka
(Continued)

FOREIGN PATENT DOCUMENTS

CN       103399678 A    11/2013
CN       104156088 A    11/2014
(Continued)

OTHER PUBLICATIONS

International Search Report and Written Opinion for International Application No. PCT/CN2017/070272, dated Apr. 13, 2017, 12 pages.
(Continued)

*Primary Examiner* — Roy P Rabindranath
(74) *Attorney, Agent, or Firm* — Westman, Champlin & Koehler, P.A.

(57) ABSTRACT

The present disclosure relates to a touch display panel including: a first touch electrode which is an unitary electrode; a second touch electrode, the second touch electrode including a plurality of second touch sub-electrodes; a detection unit for detecting a change in the capacitance value between the first touch electrode and each second touch sub-electrode of the second touch electrode and determining a touch position as a function of the position(s) of the corresponding second touch sub-electrode(s) which produce (s) a change in the capacitance value. The present disclosure also relates to a method for driving a touch display panel.

3 Claims, 4 Drawing Sheets

(58) Field of Classification Search
USPC .................................................. 345/173–178
See application file for complete search history.

(56) References Cited

U.S. PATENT DOCUMENTS

| | | | | |
|---|---|---|---|---|
| 2008/0303799 | A1* | 12/2008 | Schwesig | G06F 3/0414 345/173 |
| 2012/0147052 | A1* | 6/2012 | Homma | G06F 3/044 345/660 |
| 2012/0319966 | A1* | 12/2012 | Reynolds | G06F 3/041 345/173 |
| 2013/0241869 | A1* | 9/2013 | Kida | G06F 3/044 345/174 |
| 2013/0314359 | A1* | 11/2013 | Sudou | G06F 3/016 345/173 |
| 2015/0035790 | A1 | 2/2015 | Mo et al. | |
| 2015/0177897 | A1* | 6/2015 | Choi | G06F 3/044 345/174 |
| 2016/0179276 | A1* | 6/2016 | Nathan | G06F 3/0414 345/174 |
| 2017/0160852 | A1* | 6/2017 | Ahn | H01L 27/323 |
| 2017/0255321 | A1* | 9/2017 | Ding | G06F 3/0412 |

FOREIGN PATENT DOCUMENTS

| | | |
|---|---|---|
| CN | 205121513 U | 3/2016 |
| CN | 105718129 A | 6/2016 |
| CN | 205563527 U | 9/2016 |

OTHER PUBLICATIONS

English translation of International Search Report and Box. V of the Written Opinion for International Application No. PCT/CN2017/070272, dated Apr. 13, 2017, 8 pages.

* cited by examiner

TOUCH DISPLAY PANEL AND METHOD FOR DRIVING THE SAME

CROSS-REFERENCE TO RELATED APPLICATION

This application is a Section 371 National Stage Application of International Application No. PCT/CN2017/070272, filed on 5 Jan. 2017, which has not yet published, and claims priority to Chinese Patent Application 201610248686.5 filed on Apr. 20, 2016 in the State Intellectual Property Office of China, the disclosures of which are incorporated herein by reference in their entirety.

TECHNICAL FIELD

The present invention relates to liquid crystal display field and especially relates to a touch display panel and a method for driven the same.

DESCRIPTION OF THE RELATED ART

With a rapid development of display technology, touch display panels are increasingly used in a variety of electronic products, such as smart phones, laptops, tablet PCs.

Touch display panels may be divided into four types: resistive type, capacitive type, optical type, and sound wave type according to the different sensing technologies. Currently, the predominant touch technology is the capacitive type. However, the existing capacitive touch display panel is relatively thick, which may not use an ordinary touch and a pressure touch in combination very well.

Furthermore, a known self-capacitive touch display panel may not detect the magnitude of a touch pressure accurately as its structure is relatively simple.

SUMMARY

The present invention has been made to overcome or alleviate at least one aspect of the above mentioned disadvantages.

According to an aspect of the present invention, there is provided a touch display panel comprising: a first touch electrode which is an unitary electrode; a second touch electrode which is opposite to the first touch electrode and comprises a plurality of second touch sub-electrodes; and a detection unit configured to detecting a change in the capacitance value between the first touch electrode and each second touch sub-electrode of the second touch electrode and to determine a touch position as a function of the position(s) of the corresponding second touch sub-electrode(s) which produce(s) a change in the capacitance value.

According to an embodiment of the present disclosure, the detection unit is further configured to detect a magnitude of the changes in the capacitance values between the first touch electrode and each second touch sub-electrode of the second touch electrode, and the touch display panel further comprises a control unit which is configured to determine the magnitude of the pressure applied to the touch display panel as a function of the magnitude(s) of the change(s) in the capacitance value(s) between the first touch electrode and the corresponding second touch sub-electrode(s) to control the touch display panel to perform different operations.

According to an embodiment of the present disclosure, the control unit is further configured such that: the touch display panel performs a first operation when the change in the capacitance value between the first touch electrode and the corresponding second touch sub-electrode is less than a first preset value; and/or the touch display panel to perform a second operation which is different from the first operation when the change in the capacitance value between the first touch electrode and the corresponding second touch sub-electrode is greater than the first preset value and less than a second preset value, and/or the touch display panel performs a third operation which is different from the first operation and the second operation when the change in the capacitance value between the first touch electrode and the corresponding second touch sub-electrode is greater than the second preset value.

According to an embodiment of the present disclosure, the second touch sub-electrode is also used as a common electrode of the touch display panel.

According to an embodiment of the present disclosure, each of the second touch sub-electrodes comprises at least one sub-common electrode, the sub-common electrodes in each of the second touch sub-electrodes being connected together, and the sub-common electrodes in the adjacent second touch sub-electrodes are independent of each other and are connected to external chips via leads respectively.

According to an embodiment of the present disclosure, the touch display panel further comprises a first substrate and a second substrate which are disposed opposite to each other; and the first touch electrode is on the first substrate, and the second touch electrode is on the second substrate.

According to an embodiment of the present disclosure, the first substrate is one of a color film substrate and an array substrate, and the second substrate is the other one of the color film substrate and the array substrate, a liquid crystal layer being between the first substrate and the second substrate.

According to another aspect of the present invention, there is provided a method for driving a touch display panel, wherein the touch display panel comprises: a first touch electrode and a second touch electrode comprising a plurality of second touch sub-electrodes; and the driving method comprises steps as follows: inputting a waveform signal to the second touch electrode to charge and discharge the capacitance between the first touch electrode and the second touch electrode; detecting a change in the capacitance value between the first touch electrode and each second touch sub-electrode of the second touch electrode; and determining a touch position as a function of the position(s) of the corresponding second touch sub-electrode(s) which produce(s) a change in the capacitance value.

According to an embodiment of the present disclosure, the method for driving a touch display panel further comprises steps as follows: detecting changes in the capacitance values between the first touch electrode and the plurality of second touch sub-electrodes simultaneously; and determining a plurality of touch positions as a function of the positions of the plurality of corresponding second touch sub-electrodes which produce changes in the capacitance value.

According to an embodiment of the present disclosure, the method for driving a touch display panel further comprises steps as follows: detecting the magnitude of the changes in the capacitance values between the first touch electrode and each second touch sub-electrode of the second touch electrode; controlling the touch display panel to perform a first operation when the change in the capacitance value is less than the first preset value; and controlling the touch display panel to perform a second operation which is different from the first operation when the change in capacitance value is greater than the first preset value and is less than a second preset value.

According to an embodiment of the present disclosure, the method for driving a touch display panel further comprises steps as follows: controlling the touch display panel to perform a third operation which is different from the first operation and the second operation when the change in capacitance value is greater than the second preset value.

According to an embodiment of the present disclosure, the first operation, the second operation, and the third operation are an operation selected from operations of a click operation, an operation of a pop-up menu, and an operation of the uninstallation of an application program, respectively.

According to an embodiment of the present disclosure, the change in the capacitance value between the first touch electrode and each of the second touch sub-electrodes is detected as a function of a change in discharge time of each second touch sub-electrodes.

According to an embodiment of the present disclosure, a display signal and a touch signal are controlled alternatively in a time-multiplexed manner.

BRIEF DESCRIPTION OF THE DRAWINGS

The objects and advantages of the present disclosure will become apparent from the following description of embodiments of the present disclosure with reference to the accompanying drawings, which may provide a comprehensive understanding of the present disclosure.

DETAILED DESCRIPTION OF PREFERRED EMBODIMENTS

Figure 1:
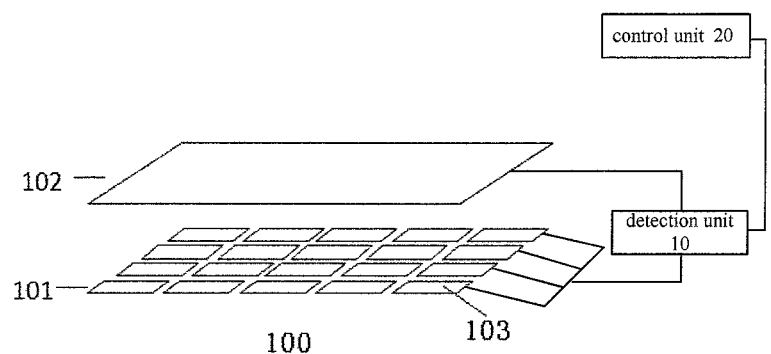
FIG. 1 is a schematic view of a touch display panel according to one embodiment of the present disclosure.

The technical solution of the present application will be described in further detail with reference to the following examples, taken in conjunction with the accompanying drawings. In the description, the same or similar reference numerals indicate the same or similar parts. The following description of the embodiments of the present invention with reference to the accompanying drawings is intended to explain the general inventive concept of the present application and should not be construed as limiting the present application.

In addition, in the following detailed description, for ease of explanation, numerous specific details are set forth in order to provide a thorough understanding of the disclosed embodiments. It will be apparent, however, that one or more embodiments may also be implemented without these specific details. In other instances, well-known structures and devices are illustrated by way of illustration to simplify the drawings.

According to a general concept of the present disclosure, there is provided a touch display comprising a first substrate and a second substrate; a first touch electrode provided on the first substrate, the first touch electrode being an unitary electrode; a second touch electrode provided on the second substrate, the second touch electrode comprising a plurality of second touch sub-electrodes; a detection unit configured to detect changes in the capacitance values between the first touch electrode and each second touch sub-electrode of the second touch electrode and to determine a touch position as a function of positions of corresponding second touch sub-electrodes which produce the changes in the capacitance values.

FIG. 1 is a schematic view of a touch display panel 100 according to one embodiment of the present disclosure. As shown in FIG. 1, the touch display panel 100 includes a first substrate, a second substrate, a first touch electrode 102 provided on the first substrate, a second touch electrode 101 provided on the second substrate, a detection unit 10 and a control unit 20. The first touch electrode 102 is a unitary first touch electrode, which may be grounded or connected to a constant voltage, and the second touch electrode 101 is composed of a plurality of second touch sub-electrodes 103 arranged in a matrix. Each of the second touch sub-electrodes 103 may be a rectangular block-like unit. The detection unit 10 is connected to the respective second touch sub-electrodes 103 of the second touch electrode 101 for detecting the magnitude of changes in capacitance values between the first touch electrode 102 and the second touch sub-electrodes 103 of the second touch electrode 101. The specific detection method will be described in detail below. The detection unit 10 determines the touch position as a function of the positions of the corresponding second touch sub-electrodes which produce changes in the capacitance values respectively. Further, the detection unit 10 is further configured to detect the magnitude of the changes in the capacitance values between the first touch electrode 102 and the respective second touch sub-electrodes 103 of the second touch electrode 101, and the control unit 20 is configured to determine the magnitude of the pressure applied to the touch display panel as a function of the magnitude of the changes in the capacitance values between the touch electrode 102 and the corresponding second touch sub-electrode 103 so as to control the touch display panel to perform different operations.

Figure 8:
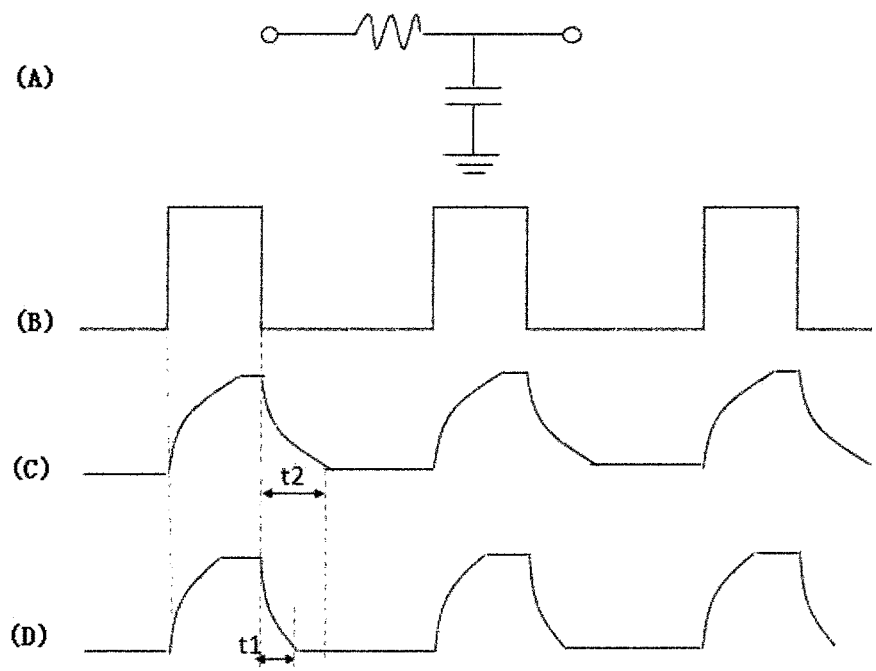
FIGS. 8 (A)-(D) are schematic diagrams of operation principle of capacitance detection.

Specifically, when the touch display panel 100 is touched, the distances between the first touch electrode 102 and the corresponding second touch sub-electrode 103 are decreased, resulting in a change in the capacitance value between the two electrodes. As an example, the detection unit 10 may detect changes in the capacitance values between the first touch electrode 102 and each second touch sub-electrodes 103 as a function of a change in the discharge time fed back by the second touch sub-electrode 103. FIG. 8 (A) shows a schematic diagram of a circuit for capacitive detection of the second touch sub-electrodes 103, and FIGS. 8 (B)-(D) respectively show the original input voltage waveform, a voltage waveform of the second touch sub-electrode 103 where a touch occurs, and a voltage waveform of the second touch sub-electrode 103 where the touch does not occur. As shown in FIG. 8 (A), the circuit for the capacitance detection of the second touch sub-electrode 103 may be equivalent to a circuit including impedance and capacitive reactance. Therefore, when the square-wave input voltage as shown in FIG. 8 (B) is applied onto the second touch sub-electrode 103, the voltage waveform detected on the second touch sub-electrode 103 is no longer a regular square wave due to the presence of capacitive reactance in the circuit, which voltage waveform will includes a charging process and a discharge process, as shown in FIGS. 8 (C) and 8 (D). Further, as for the second touch sub-electrode 103 where a touch occurs, since the distance between the second touch sub-electrode 103 and the first touch electrode 102 is reduced due to the touch, accordingly the capacitance value between these two electrodes may be increased. Such an increase in capacitance value will affect the charging process and the discharge process, generally will lengthen the charging time and discharge time. Comparing FIG. 8 (C) with FIG. 8 (D), the discharge time t2 in FIG. 8 (C) is significantly larger than the discharge time t1 in FIG. 8 (D). In this way, the detection unit 10 may detect the change in the capacitance values by detecting the discharge time of the voltage waveform of the second touch sub-electrodes 103. On the other hand, the detection unit 10 detects that the discharge time has changed such that it detect a change in the capacitance value. The detection unit 10 may determine the location of the touch according to the position of the corresponding second touch sub-electrode 103 in the second touch electrode 10 which produce changes in the capacitance values.

On the other hand, the detection unit 10 may also detect the magnitude of the change in the discharge time, that is, a specific value of t2−t1, and the detection unit 10 may also detect the magnitude of the change in the capacitance value according to the magnitude of the change in the discharge time, while the control unit 20 may determine the magnitude of the touch pressure, for example may determine whether a current touch action is a light tapping or a heavy stress, as a function of the magnitude of the changes in the capacitance values between the first touch electrode 102 and the second touch sub-electrodes 103. Also, the control unit 20 may also control the touch display panel 100 to perform different operations based on the determined magnitude of the touch pressure, which will be further described in detail below.

Figure 2:
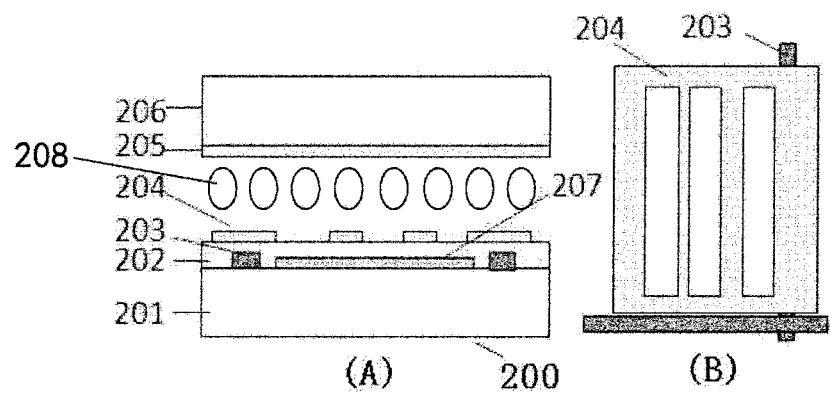
FIGS. 2 (A)-2 (B) are schematic views of a pixel unit structure of a touch display panel according to an embodiment of the present disclosure.

Referring FIG. 2, FIGS. 2(*a*)-(B) are schematic views of a pixel unit structure 200 of the touch display panel according to the present disclosure. In the illustrated embodiment, the touch display panel includes an upper substrate (the first substrate) 206, a lower substrate (a second substrate) 201, and a liquid crystal layer 208 between the two substrates. The upper substrate 206 may be a color film substrate, and the lower substrate 201 may be an array substrate.

In the illustrated embodiment, as shown in FIG. 2 (A), within a pixel unit structure 200, the array substrate 201 is provided on it with an insulating layer 202, data lines 203, a pixel electrode 207, and a common electrode 204. The data lines 203 and the pixel electrode 207 are provided in the insulating layer 202, and the common electrode 204 is disposed on the insulating layer 202.

In this embodiment, the touch display panel may be constructed of an IPS (in-plane switch) type or ADS (Advanced Super Dimension Switch) type liquid crystal display panel. For this type of liquid crystal display panel, the voltage between the common electrode 204 and the pixel electrode 207 may control rotations of the liquid crystal molecules in the liquid crystal layer, thereby controlling the display of the liquid crystal.

In this embodiment, the common electrode 204 also serves as a second touch sub-electrode. Accordingly, as shown in FIG. 2(A), a first touch electrode 205 (corresponding to the first touch electrode 102 in FIG. 1) is provided on a side of the color film substrate 206 facing the liquid crystal layer.

FIGS. 5(A)-(B) schematically show schematic views of a touch diagram of a touch display panel according to an embodiment of the present application, as shown in the figure, when a user touches the color film substrate 503, a press force thus applied causes the color film substrate 503 to be deformed such that the distances between the first touch electrode 502 (which corresponds to the first touch electrode 102 in FIG. 1) and the second touch sub-electrodes 501 (also the common electrode, which corresponds to the second touch sub-electrodes 103 respectively) is reduced, such that and the capacitance values between the first touch electrode 502 and the second touch sub-electrodes 501 are changed. According to the positions of the corresponding second touch sub-electrodes 501 which produce changes in the capacitance values, the position of the touch may be determined. Further, depending on the magnitude of the changes in the capacitance values, the magnitude of the touch pressure may be determined, which will be further explained below.

Figure 3:
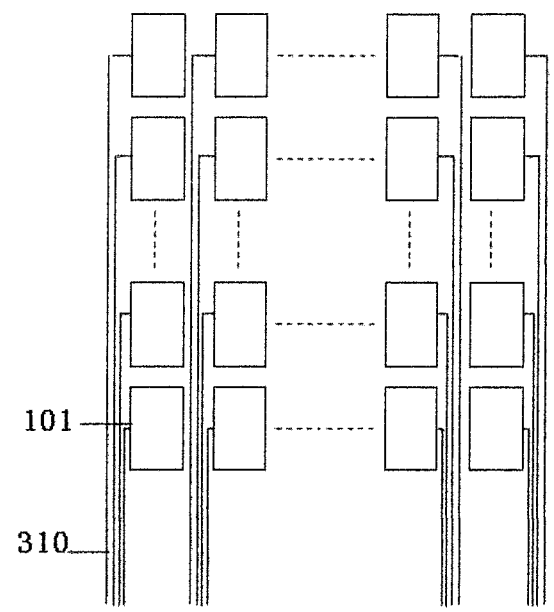
FIG. 3 is a schematic view showing wiring of a second touch sub-electrode of a touch display panel according to an embodiment of the present disclosure.
Figure 4:
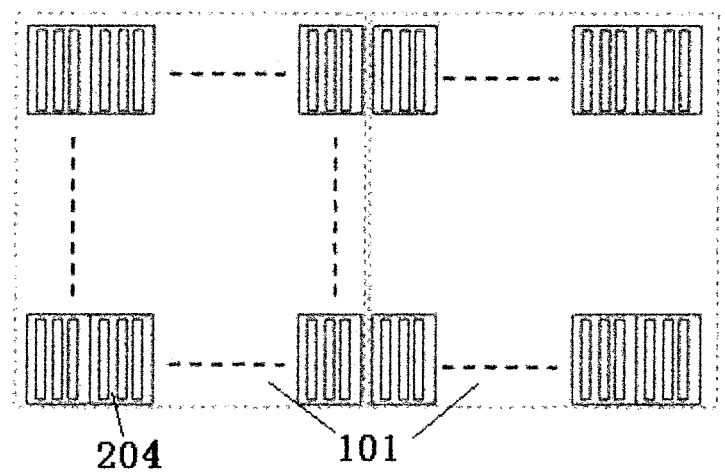
FIG. 4 is a schematic view showing a manner of setting a second touch sub-electrode serving as a common electrode according to an embodiment of the present disclosure.

Referring to FIG. 2 again, as shown in FIG. 2 (B), the common electrode 204 may be a comb-shaped electrode. FIG. 3 is a schematic diagram of the wiring of a second touch sub-electrode of a touch display panel according to an embodiment of the present disclosure. FIG. 4 is a schematic view showing a manner of setting a second touch sub-electrode serving as a common electrode according to an embodiment of the present disclosure. Referring FIGS. 2 (C), 3 and 4, at least one common electrode 204 may be provided in each second touch sub-electrodes 103, thereby each common electrodes 204 may be referred to as a sub-common electrode, and the sub-common electrodes 204 in each second touch sub-electrode 103 are connected together and the sub-common electrodes 204 in the adjacent second touch sub-electrodes 103 are independent of each other and are connected to the external chip(s) via the lead 310 of for example the metal wire.

Figure 6:
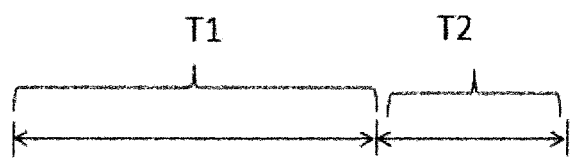
FIG. 6 is a schematic view showing time-sharing touch of a touch display panel according to an embodiment of the present disclosure.

In the above embodiments, the common electrode 204 also serves as an electrode for display of the liquid crystal and a second touch sub-electrode for touching. In order to coordinate the liquid crystal display and touch function, the driving circuit of the touch display panel 100 may alternately control the display signal and the touch signal in a time-multiplexed manner FIG. 6 is a schematic view showing time-sharing touch of a touch display panel according to an embodiment of the present disclosure. In the embodiment of FIG. 6, during a frame of time, the first time period T1 is used for liquid crystal display, while the rest of time period T2 is used for touching.

In the above embodiment, the pixel unit structure of the display panel is not fully shown for the sake of clarity. Although it not shown, in the pixel unit structure shown in FIGS. 2 (A)-2 (B), the array substrate 201 may also be provided on it with a gate, scanning lines, a gate insulating layer, a semiconductor layer, a source/drain electrode and lower alignment film and the like, and the color film substrate 206 may be provided on it with a color film photoresist, a black matrix, and an upper alignment film and the like. The array substrate 201 may be a glass substrate.

Thus, the above embodiment uses the second touch electrode provided on the array substrate, and the second touch electrode comprises a plurality of second touch sub-electrodes 103, which is capable of accurately determining the touch position and size as a function of the change in the capacitance value, so as to achieve multi-point touch. Further, the common electrode on the array substrate may also serve as the second touch sub-electrode. Thus it is unnecessary to provide an additional second touch sub-electrode and the thickness of the panel may be further reduced.

Figure 5:
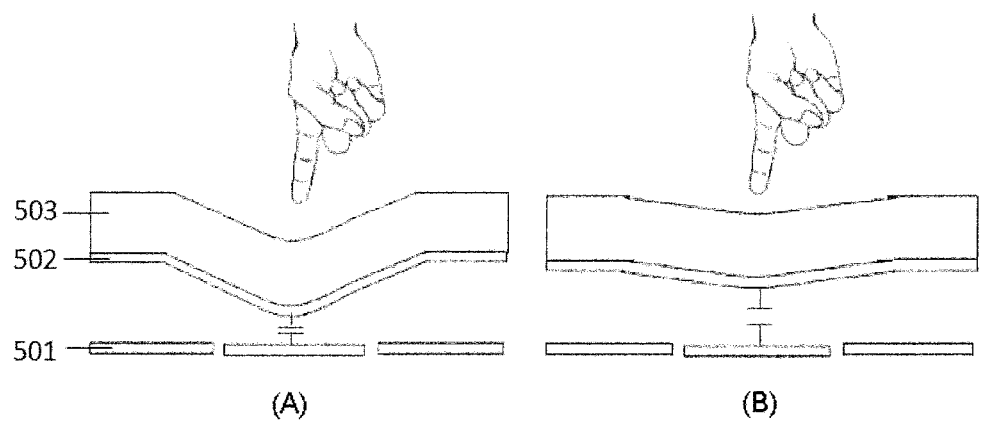
FIGS. 5 (A)-(B) are schematic views of a touch applied on a touch display panel according to an embodiment of the present disclosure.

It is further explained hereinafter how to determine the magnitude of the touch pressure as a function of the magnitude of the changes in capacitance values. Referring again to FIG. 5, FIGS. 5(A) and 5(B) show the touch diagrams under different touch pressure operations, respectively. As shown in FIG. 5 (A), if the pressure applied onto the touch color film substrate 503 is relatively large, the deformation of the color film substrate 503 is relatively large correspondingly, and thus the changes in the capacitance values between the first touch electrode 502 and the second touch sub electrodes 503 are significant. In contrast, as shown in FIG. 5 (B), if the pressure applied to the touch color film substrate 503 is relatively small, the deformation of the substrate 503 is also relatively small correspondingly, and thus the changes in the capacitance values between the first touch electrode 502 and the second touch sub-electrodes 503 are small. That is, the magnitude of the changes in the capacitance values between the first touch electrode 502 and the second touch sub-electrode 503 is directly related to the pressure applied to the touch substrate 503. In addition, since the electrode 502 is provided on the color film substrate 503, the touch is detected according to the capacitance value between the electrode 501 and the electrode 502. At this time, the touch is no longer affected by the contact area of the finger; instead, only relates to the distance between the electrodes 501 and 502. Therefore, it is possible to accurately detect the magnitude of the touch pressure as a function of the magnitude of the changes in the capacitance values.

Figure 7:
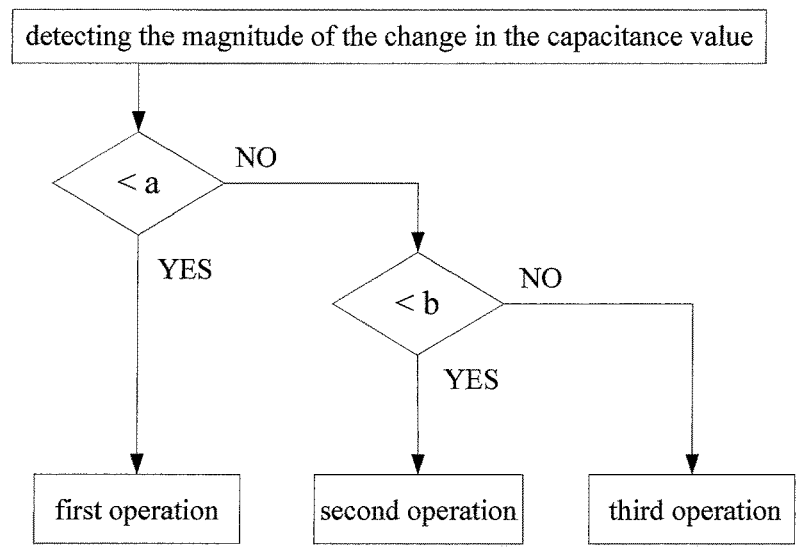
FIG. 7 is a flow chart illustrating a method for driving a touch display panel according to an embodiment of the present disclosure.

Further, as shown in FIG. 7, an exemplary control unit according to an embodiment of the present disclosure may be further configured such that the touch display panel performs a first operation when the change in the capacitance value between the first touch electrode and the corresponding second touch sub-electrode is less than a first preset value a; and/or the touch display panel to perform a second operation which is different from the first operation when the change in the capacitance value between the first touch electrode and the corresponding second touch sub-electrode is greater than the first preset value a and less than a second preset value b; and/or the touch display panel performs a third operation which is different from the first operation and the second operation when the change in the capacitance value between the first touch electrode and the corresponding second touch sub-electrode is greater than the second preset value b.

According to the touch display panel of the above-described embodiment, as shown in FIG. 7, the driving method thereof may include the steps of:

inputting a waveform signal to the second touch electrode to charge and discharge the capacitance between the first touch electrode and the second touch electrode, as shown in FIG. 8;

detecting changes in the capacitance values between the first touch electrode and each second touch sub-electrode of the second touch electrode;

determining a touch position as a function of the position of the corresponding second touch sub-electrodes which produce changes in the capacitance values.

Specifically as described above, the distance between the touched first touch electrode and the corresponding second touch sub-electrodes change when being touched, resulting in a change in respective capacitance between the two electrodes, and the time for the discharge of the capacitance changing accordingly. The detection unit detects the time for discharge of the capacitance and the position corresponding to the second touch sub-electrode whose discharge time is changed is the position where the touch occurs.

Specifically, the detection unit may detect changes in the capacitance value between the first touch electrode and the plurality of second touch sub-electrodes simultaneously; and determine a plurality of touch positions as a function of the positions of the plurality of corresponding second touch sub-electrodes which produce changes in the capacitance value.

Further, the detection unit may also detect the magnitude of the change in the capacitance value between the first touch electrode and each second touch sub-electrode of the second touch electrode;

the touch display panel performs a first operation when the change in the capacitance value is less than the first preset value a;

the touch display panel performs a second operation which is different from the first operation when the change in capacitance value is greater than the first preset value a and is less than a second preset value b.

Alternatively, the touch display panel performs a third operation which is different from the first operation and the second operation when the change in capacitance value is greater than the second preset value b.

As an example, the first operation, the second operation, and the third operation are an operation selected from operations of a click operation, an operation of a pop-up menu, and an operation of the uninstallation of an application program, respectively. For example, the first operation is a click operation, the second operation is an operation of a pop-up menu, and the third operation is an operation of the uninstallation of an application program.

Further, the common electrode acts both as an electrode for display of the liquid crystal and a second touch sub-electrode for touching, as such, in order to coordinate display of the liquid crystal and the touch function, it is possible to alternately control the display signal and the touch signal in a time-multiplexed manner.

In the above embodiments, the detection unit and the control unit are separately described in order to interpret the present disclosure. In other embodiments, the detection unit and the control unit may also be integrated into one unit, for example, both of which are integrated into a microprocessor, IC or other chips of a display panel.

The touch display panel according to the above embodiment and the driving method thereof use a plurality of second touch sub-electrodes arranged in an array on the array substrate, so as to be able to accurately determine the touch position based on the change in the capacitance value, so as to realize multi-touch control. In addition, the common electrode on the array substrate may serve as the second touch sub-electrode, and it is possible to further reduce the thickness of the panel without providing a separate second touch sub-electrode, thereby enabling the display panel to be lightened and slimmed. Further, the touch display panel according to the above-described embodiment may determine the magnitude of the touch pressure according to the magnitude of the changes in capacitance values between the first touch electrode and the second touch sub-electrodes, and may perform different operations based on different magnitude of the touch pressure. Therefore, the touch display panel of the present disclosure may achieve multi-touch control while ensuring that the panel is lightened and slimmed, and may accurately detect the magnitude of the touch pressure.

While the present disclosure has been described with reference to the accompanying drawings, the embodiments shown in the drawings are intended to be illustrative of the embodiments of the present disclosure and are not to be construed as limiting the present disclosure.

While some embodiments of the present disclosure with a general inventive concept have been shown and described, it will be understood by those ordinary skilled in the art that modification may be made in these embodiments without departing from the principles and spirit of the general concept of this disclosure. The scope of the disclosure is defined by the claims and their equivalents.

What is claimed is:

1. A method for driving a touch display panel, wherein the touch display panel comprises: a first touch electrode and a second touch electrode comprising a plurality of second touch sub-electrodes; and the driving method comprises:
   inputting a waveform signal to the second touch electrode to charge and discharge the capacitance between the first touch electrode and the second touch electrode;
   detecting a change in the capacitance value between the first touch electrode and each second touch sub-electrode of the second touch electrode; and
   determining a touch position as a function of the position(s) of the corresponding second touch sub-electrode(s) which produce(s) a change in the capacitance values,
   detecting the magnitude of the change in the capacitance value between the first touch electrode and each second touch sub-electrode of the second touch electrode;
   controlling the touch display panel to perform a first operation when the change in the capacitance value is less than the first preset value; and
   controlling the touch display panel to perform a second operation which is different from the first operation when the change in capacitance value is greater than the first preset value and is less than a second preset value,
   detecting changes in the capacitance value between the first touch electrode and the plurality of second touch sub-electrodes simultaneously; and
   determining a plurality of touch positions as a function of the positions of the plurality of corresponding second touch sub-electrodes which produce changes in the capacitance value,
   controlling the touch display panel to perform a third operation which is different from the first operation and the second operation when the change in capacitance value is greater than the second preset value,
   the first operation, the second operation, and the third operation are an operation selected from operations of a click operation, an operation of a pop-up menu, and an operation of the uninstallation of an application program, respectively.

2. The method for driving a touch display panel according to claim 1, wherein the change in the capacitance value between the first touch electrode and each of the second touch sub-electrodes is detected as a function of a change in discharge time of each second touch sub-electrodes.

3. The method for driving a touch display panel according to claim 1, wherein a display signal and a touch signal are controlled alternatively in a time-multiplexed manner.

* * * * *